(No Model.) 5 Sheets—Sheet 1.
G. W. LINGLE & J. F. ROOP.
MACHINE FOR FORMING OAR BLADES.

No. 318,763. Patented May 26, 1885.

(No Model.)
5 Sheets—Sheet 2.

G. W. LINGLE & J. F. ROOP.
MACHINE FOR FORMING OAR BLADES.

No. 318,763.
Patented May 26, 1885.

(No Model.) 5 Sheets—Sheet 3.
G. W. LINGLE & J. F. ROOP.
MACHINE FOR FORMING OAR BLADES.

No. 318,763. Patented May 26, 1885.

(No Model.) 5 Sheets—Sheet 4.

G. W. LINGLE & J. F. ROOP.
MACHINE FOR FORMING OAR BLADES.

No. 318,763. Patented May 26, 1885.

(No Model.) 5 Sheets—Sheet 5.

G. W. LINGLE & J. F. ROOP.
MACHINE FOR FORMING OAR BLADES.

No. 318,763. Patented May 26, 1885.

UNITED STATES PATENT OFFICE.

GEORGE W. LINGLE AND JAMES F. ROOP, OF STRYKER, OHIO.

MACHINE FOR FORMING OAR-BLADES.

SPECIFICATION forming part of Letters Patent No. 318,763, dated May 26, 1885.

Application filed March 3, 1885. (No model.)

*To all whom it may concern:*

Be it known that we, GEORGE W. LINGLE and JAMES F. ROOP, citizens of the United States, residing at Stryker, in the county of Williams and State of Ohio, have invented certain new and useful Improvements in Machines for Forming Oar-Blades, of which the following is a specification, reference being had therein to the accompanying drawings.

Our invention relates to improvements in machines for forming oar-blades; and the novelty consists in the construction, combinations, and arrangements of the various parts for service, substantially as hereinafter fully set forth, and pointed out in the claims.

The object of our invention is to produce a machine wherein an oar-blank can be reduced to the proper thickness and width to form a symmetrical and properly-proportioned oar-blade by being passed through and between revolving cutters, one-half of the blade being formed at each passage of the blank between the cutters, thus completing the blade by passing it twice through the machine.

Another object of our invention is to form a rib upon the exterior surfaces of the blade of the oar, all as hereinafter fully set forth.

Figure 1:
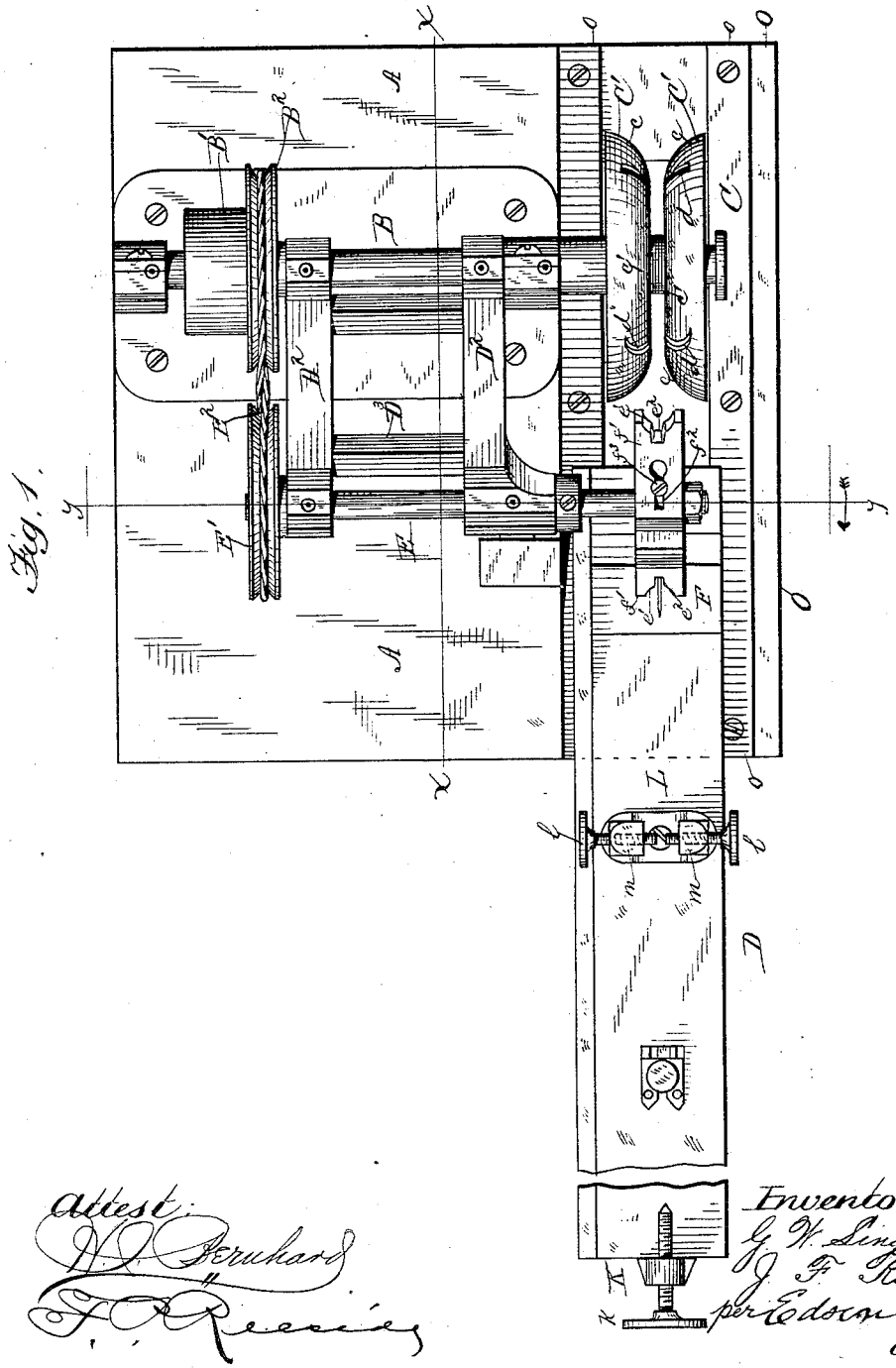
Figure 2:
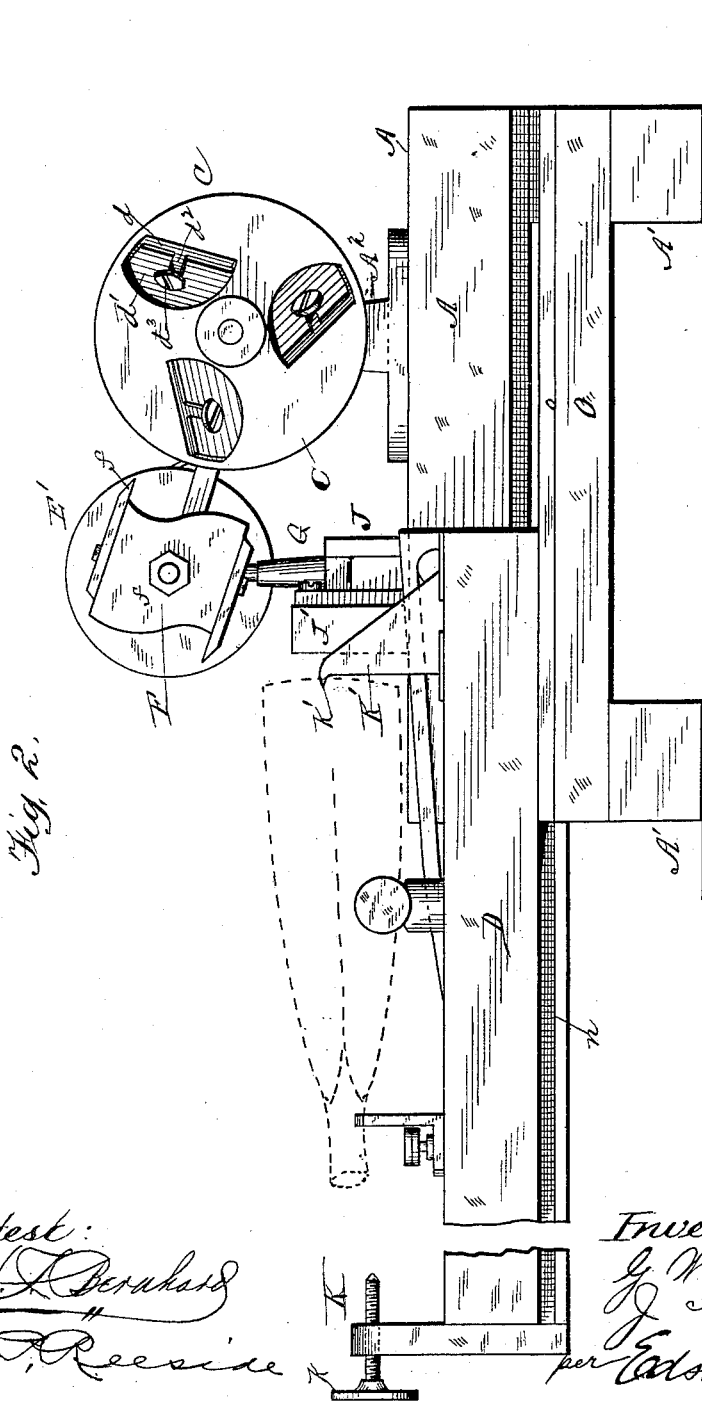
Figure 3:
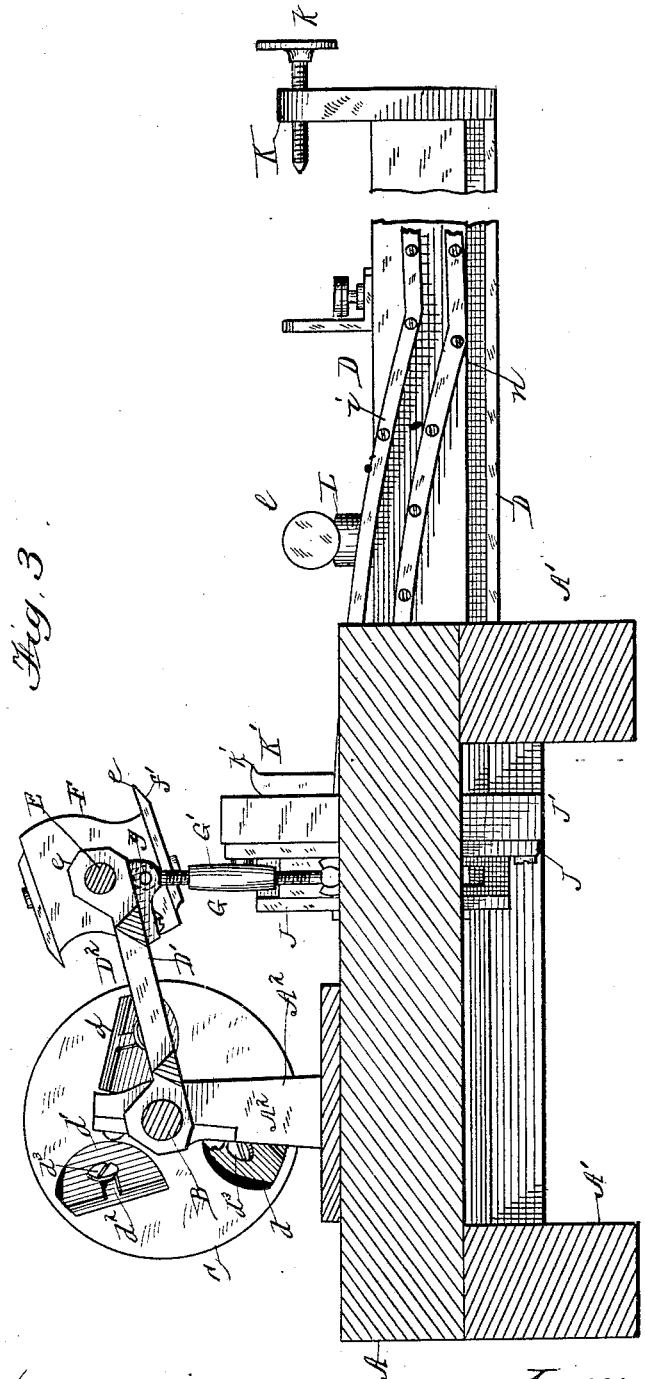
Figure 4:
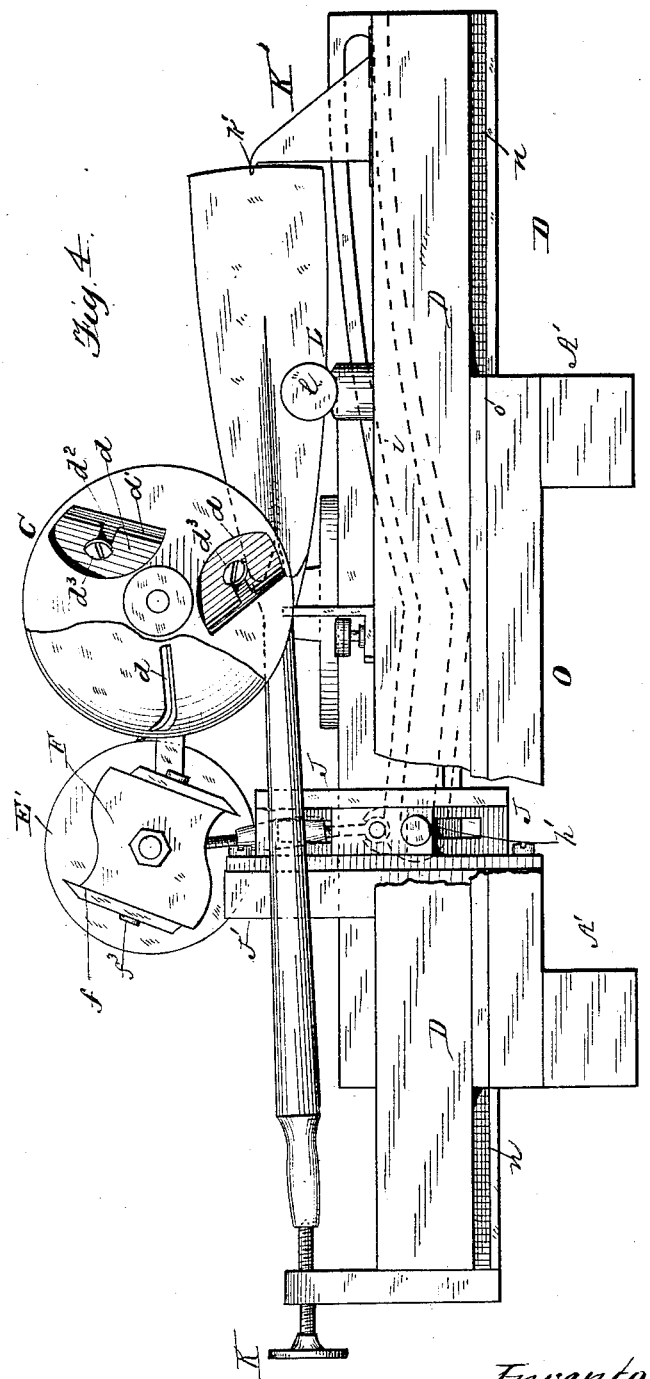
Figure 5:
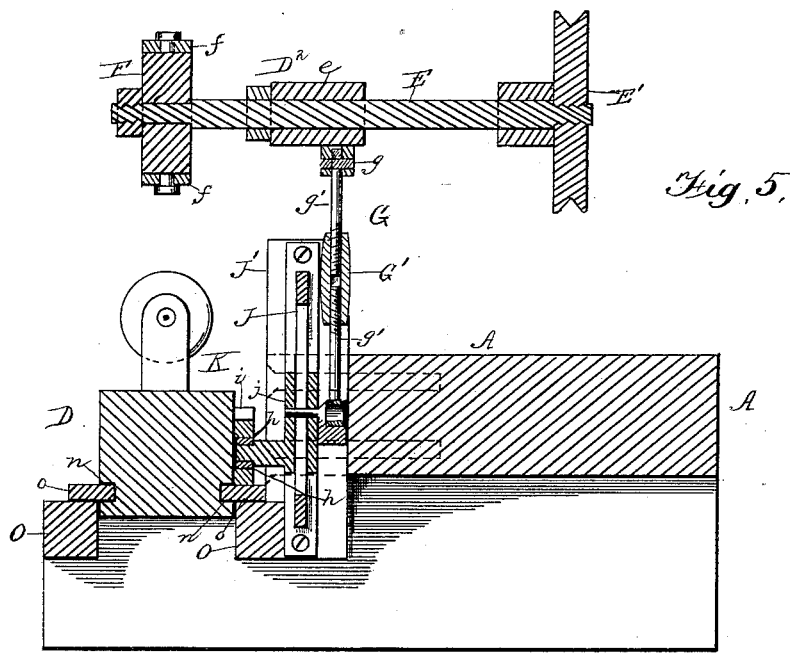
Figure 6:
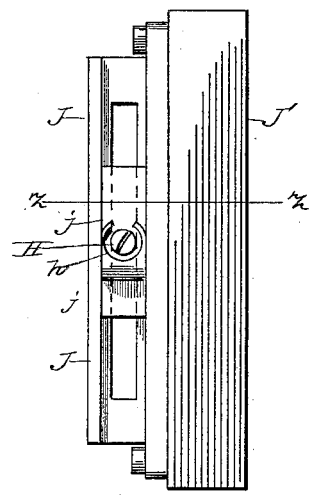
Figure 7:
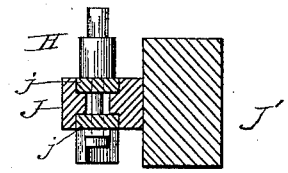

In the drawings hereto annexed, which form a part of this specification, Figure 1 is a plan view of our improved oar-planing machine. Fig. 2 is a side elevation thereof, showing the blank in dotted lines in position upon the carriage. Fig. 3 is a sectional view in the direction of the longitude of the machine on the line $x$ $x$, and looking in the direction indicated by the arrow in Fig. 1. Fig. 4 is a side elevation thereof, showing the oar in full lines after having been passed twice between the cutters. Fig. 5 is a transverse sectional view on the line $y$ $y$ of Fig. 1. Fig. 6 is a detail view of the guides and their supporting-standard, and Fig. 7 is a cross-section thereof on the line $z$ $z$ of Fig. 6.

Like letters of reference in the several drawings denote like parts in all the figures.

Referring to the drawings, A designates a platform or table supported at proper height from the ground upon suitable standards, A'; B, a shaft mounted in suitable boxes secured to standards $A^2$, which are spaced apart on the platform or table A, said shaft having a pulley, B', secured thereto at one end, to which power from any suitable motor is applied by a belt, (not shown,) while the other end of said shaft is extended beyond the edge of the table and over a carriage, D, where it has a cutter, C, secured thereon, and constructed as presently described.

The cutter C consists of two disks, C' C', secured on the shaft B a short distance from each other, each disk having a plane outer surface and a concave and plane inner surface, as indicated at $c$ $c$. (See Fig. 1.) Each disk is provided with a series of slots, $d$, of approximately triangular shape and arranged around the peripheries thereof, said slots extending transversely and obliquely through the disks to the plane of rotation thereof. In each slot, of which there are preferably three to each disk, is arranged a cutter-blade, $d'$, having a slot, $d^2$, held in position therein adjustably by a screw or bolt, $d^3$.

It is obvious that the cutter-blades can be adjusted or projected beyond the face of the disks to any desired degree by means of the set-screw and slot in the blade, and that the blade can be easily and readily removed from the disk by detaching the screw when it becomes necessary to sharpen the blade, or for other causes.

D' designates a frame composed of arms $D^2$, pivotally connected to the shaft B at their forward ends, and a cross-bar, $D^3$, connecting the same together near their outer ends, which are enlarged, as at $e$, and receive and support a shaft, E, as shown in Figs. 1 and 3. One end of this shaft E is provided with a grooved pulley, E', adapted to receive motion and revolve the shaft E by a belt, $E^2$, from a larger and similar pulley, $B^2$, secured to the shaft B adjacent to the pulley $B^2$, as shown, while the other end of said shaft E is extended beyond the platform A similarly to the shaft B, and provided with a cutter, F, comprising a body or base, $f$, preferably of square contour, and provided on its opposite faces with cutter-blades $f'$, having slots $f^2$, through which pass adjusting-screws $f^3$, thus providing means for projecting and withdrawing the blades beyond the edges of the base to bring them into or out of action and to regulate the depth of the cut, said cutter F being arranged in a line with the main and finishing cutter C, as shown in Fig. 1. One end of cutter-blade $f'$ is beveled, as at $e$, and provided with cutaway portions $e'$ $e^2$, the former being cut in curved lines obliquely and inwardly, while the latter and deeper slots are in straight lines and have sharp cutting-edges. We attach importance to this peculiar construction of cutter-blades, as by means of the deeper slots $e^2$ and means hereinafter described the edge of the blade of the oar is trimmed to the proper thickness, and by means of the curved portions thereof the oar-blade is trimmed to the proper contour, and a strengthening-rib formed thereon and preferably extending from a point a little beyond its middle to the point where the blade joins the handle.

The frame D' is supported at its outer end by a standard, G, pivoted at its upper end, as at $g$, to a lug on one side of said frame, and having a cross-head, H, arranged at a right angle thereto, and having a roller, $h'$, mounted on its extreme outer edge and adapted to bear on an inclined cleat or cam-track, $i$, of approximately the shape of the oar-blade secured to that surface of a carriage, D, adjacent to the platform A. The standard is provided with plates $j$, secured thereto, as shown, and adapted to move in guides J, secured to the face of an upright or standard, J', located at the edge of the platform. The standard G may be made in two parts or sections, $g'$ $g'$, each of which is provided with a screw-thread adapted to work in a sleeve, G', whereby the standard can be lengthened or shortened to regulate the depth of the cut of the primary cutter F on the edge of the oar-blank.

The carriage D is provided with centers K K', one of which is provided with a screw, $k$, while the other one is preferably a spur or tooth, $k'$, against which the blank is forced and tightly clamped in position.

To prevent lateral movement of the blank, we provide clamps L L, arranged near the middle of the carriage and provided with thumb-screws $l$ $l$, adapted to travel toward and from each other transversely across the carriage in suitable supports, $m$ $m$, affixed to said carriage.

The carriage is provided with grooves $n$ in opposite side faces, near the lower ends thereof, adapted to move or slide in cleats or ways $o$ secured to timbers O, located to the side of and below the platform A, as clearly shown.

The operation of our invention is as follows: The blank having been placed in the carriage and tightly clamped therein, the carriage is moved forward by hand or otherwise, and the blank subjected first to the action of the primary cutter F, which trims the edge of the blade and gives the same the proper contour. This cutter, being mounted in the frame D and having the friction-roller bearing in the cam-track, is caused to trim the edge of the blade to the proper shape, the frame and cutter being held above and in contact with the blank at the proper height, which can be increased or diminished by adjusting the sleeve F' or cutter-blades, as before described. By reason of the roller $h'$ bearing in the cam-track at its highest point of elevation when the carriage is started, and gradually dropping to a lower plane, the cutter F is caused to trim the edge of the blank and give it the desired contour as the carriage moves forward. The blank is next passed to and between and subjected to the action of the finishing-cutter C, the blades of which trim or cut the sides of the blank away from the rib. The blade is so adjusted upon its centers with reference to the elevation of the cutters that the latter cut just one-half the way through the blade for a short distance, when the blank begins to recede from the cutters gradually, transferring the outer surface thereof more and more to the curved portions of the cutting-blades where the rib is formed upon the blank.

The thickness of the blade can be increased or diminished by adjusting the blades inwardly or outwardly, as will be readily understood.

The blank after having been once passed between the cutters is removed, the carriage runs back, the blank again secured therein with the opposite and unfinished edge uppermost, and the carriage again moved forward, again subjecting the blank to a second action of the cutters, thereby completing the oar, ready to be smoothed, oiled, or finished, as desired.

The handle or cylindrical portion of the oar can be made either before or after making the blade.

Modifications in the form and proportion of parts and in details of construction herein shown and described as an embodiment of our invention may be made without departing from the principle or sacrificing the advantages thereof—as, for instance, other means than that shown and described may be employed for clamping the blank to the carriage, &c. We would therefore have it understood that we hold ourselves at liberty to make such changes and alterations as fairly fall within the scope of our invention.

What we claim as our invention, and desire to secure by Letters Patent of the United States, is—

1. In an oar-planing machine, the combination of a revolving cutter, a carriage having a cam-track, a pivoted vertically-adjustable frame having an adjustable standard carrying a roller adapted to bear in the cam-track, and a shaft mounted in said frame and carrying a cutter-head, said standard having a cross-head adapted to move in guides or uprights secured to a platform, substantially as and for the purpose specified.

2. The combination of a power-shaft carrying a cutter, a pivoted frame carrying a cutter, the shaft of which is geared with said power-shaft, and having a standard which is raised and lowered by a carriage with which said standard is connected as said carriage moves under the cutters, substantially as and for the purpose set forth.

3. The combination of a power-shaft having a cutter, a pivoted vertically-adjustable frame having a supporting-standard at one end carrying a roller, a shaft belted to said power-shaft and carrying a cutter in line with the cutter on the power-shaft, and a carriage provided with a cam-track in which said roller is adapted to bear and govern the movements of the frame, substantially as and for the purpose described.

4. In an oar-planing machine, the combination of a carriage provided at one side with a cam-track, a power-shaft mounted in standards and having a cutter arranged over said carriage, a pivoted frame having a standard provided with a roller adapted to bear in the cam-track, and a shaft mounted in said frame and carrying a cutter arranged in the same plane of the power-shaft cutter, substantially as and for the purpose described.

5. In an oar-planing machine, the combination of a power-shaft mounted in standards and carrying a cutter-head, a pivoted vertically-adjustable frame having a standard provided with a roller, guides secured to a standard between which the frame-supporting standard is adapted to move, a carriage having a cam-track, and a shaft mounted in the arms of said frame and carrying a cutter-head arranged over the carriage, substantially as and for the purpose described.

6. In an oar-planing machine, the combination of a power-shaft, B, having a pulley and a cutter, C, a frame, D', having its arms pivoted to said shaft and having a standard, G, pivotally connected thereto, a roller mounted on said standard, a carriage having a cam-track, $i$, and a shaft, E, mounted in said frame and carrying a cutter, F, substantially as shown and described.

7. In an oar-planing machine, the combination of a power-shaft, B, having a pulley, $B^2$, and a cutter, C, comprising two disks having adjustable cutter-blades, a pivoted frame having an adjustable standard carrying a roller, a carriage provided with clamping devices, and a cam-track in which the roller is adapted to bear, and a shaft, E, mounted in said frame and belted to the power-shaft, and a cutter-head, F, secured to said shaft E and having adjustable cutter-blades, substantially as and for the purpose described.

In testimony whereof we affix our signatures in presence of two witnesses.

GEORGE W. LINGLE.
JAMES F. ROOP.

Witnesses:
W. B. KITZMILLER,
SQUIRE UMSTEAD.